United States Patent
Morrison et al.

(10) Patent No.: US 6,251,185 B1
(45) Date of Patent: Jun. 26, 2001

(54) SYSTEM FOR DELIVERING CHOPPED FIBERGLASS STRANDS TO A PREFORM SCREEN

(75) Inventors: Richard S. Morrison, Concord; Robert E. Mollman, Perrysburg; Kenneth T. Hutchinson, Roaming Shores, all of OH (US)

(73) Assignee: Molded Fiber Glass Companies, Ashtabula, OH (US)

( * ) Notice: Subject to any disclaimer, the term of this patent is extended or adjusted under 35 U.S.C. 154(b) by 0 days.

(21) Appl. No.: 09/285,332

(22) Filed: Apr. 2, 1999

(51) Int. Cl.[7] .............................. B05C 5/00; B05C 19/04
(52) U.S. Cl. ...................... 118/681; 118/679; 118/690; 118/308
(58) Field of Search ................................ 264/121, 109 T; 118/679, 681, 688, 690, 308; 901/14; 156/62

(56) References Cited

U.S. PATENT DOCUMENTS

| | | | |
|---|---|---|---|
| 3,491,443 | * | 1/1970 | Fram ....................................... 30/128 |
| 3,984,054 | * | 10/1976 | Frochaux .............................. 239/424 |
| 4,088,469 | * | 5/1978 | Schaefer ..................................... 65/5 |
| 5,092,522 | * | 3/1992 | Dykmans ............................... 239/61 |
| 5,093,059 | * | 3/1992 | Nathoo et al. ........................ 264/121 |
| 5,645,884 | * | 7/1997 | Harlow, Jr. et al. ...................... 427/8 |

\* cited by examiner

Primary Examiner—Richard Crispino
Assistant Examiner—Yewebdar T Tadesse
(74) Attorney, Agent, or Firm—Renner, Otto, Boisselle & Sklar, LLP

(57) ABSTRACT

A system for placing chopped fiberglass strands onto a preform screen where desired includes a relatively light-weight chopper/feeder unit mounted on the outer end of a robot arm in closely spaced relation to the preform screen for robotically directing the chopped fiberglass strands onto the preform screen where desired with very little loss. Within the chopper/feeder unit is a cutter for chopping the fiberglass strands to the desired length. The cutter is driven by a variable speed motor attached to the chopper/feeder unit. Also attached to opposite sides of the chopper/feeder unit are a pair of air amplifiers that produce a sufficient volume and velocity of air flow around said cutter and through said unit to carry the chopped fiberglass strands away from the cutter and out through a discharge chute onto the preform screen.

18 Claims, 4 Drawing Sheets

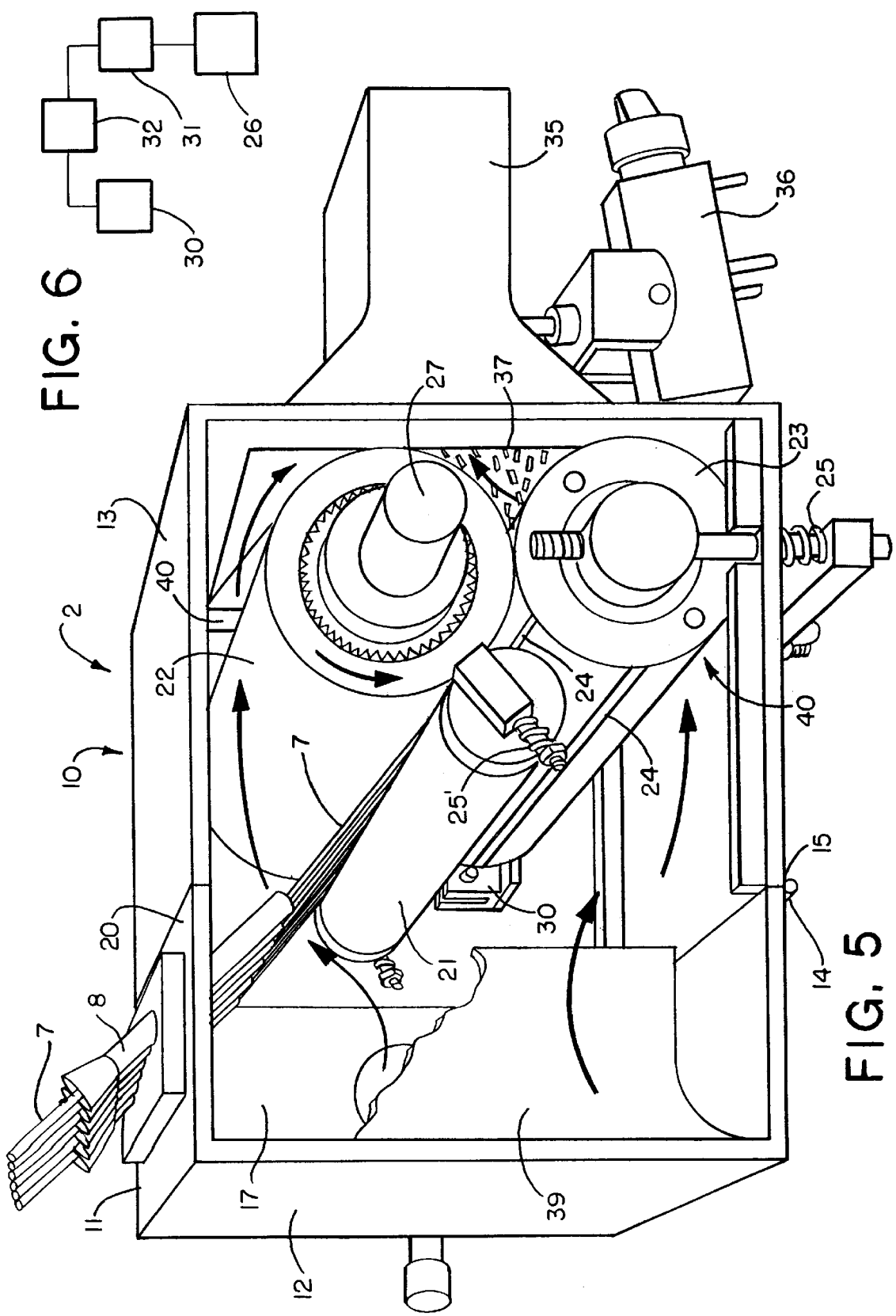

SYSTEM FOR DELIVERING CHOPPED FIBERGLASS STRANDS TO A PREFORM SCREEN

FIELD OF THE INVENTION

This invention relates generally to a system for delivering chopped glass fibers to a preform screen where desired with very little loss to form preforms used to make reinforced polyester parts.

BACKGROUND OF THE INVENTION

Chopped glass fiber random mats or preforms are commonly used to make reinforced polyester parts. A preform generally consists of approximately 90 to 95% chopped fiberglass strands bonded together with approximately 5 to 10% resin binder. These preforms are then placed in a mold located within a compression press and resin paste is applied to mold the part into the final desired shape.

Preforms are formed into substantially the exact shape of the desired part using a preform screen of perforated material the exact shape of the male mold. The preform screen is mounted over a fan inlet which draws air through the preform screen to capture chopped glass fibers on the screen and hold them in place while a binder emulsion is sprayed onto the fibers and cured to hold the fibers in the proper shape during compression molding of the part.

The current system used to deliver chopped fiberglass strands to the preform screen includes a stationary chopper driven by an electric motor to chop a series of continuous fiberglass strands, called glass roving, into lengths for example of one-half inch to four inches. The cut glass fibers drop through a feed funnel into an air stream from a stationary blower which blows the glass fibers toward the preform screen through a flexible delivery tube that is moved manually relative to the preform screen.

While this chopper delivery system has been used effectively for many years, a major disadvantage is that the stationary chopper blower unit must be mounted several feet from the preform screen to accommodate the size and shape of the preform. The greater the distance between the chopper blower unit and the preform screen, the longer the distance the chopped glass fibers must be carried through the air to the screen. As this distance increases, a certain amount of the fiberglass strands fall out of the air stream and are lost. Also, with a longer flexible tube, the greater the risk that the tube will bend or kink, causing the fiberglass strands to clump up and drop out by gravity or causing the tube itself to clog up.

SUMMARY OF THE INVENTION

The present invention provides a system for placing the chopped fiberglass strands onto the preform screen where desired with very little loss.

In accordance with one aspect of the invention, the system includes a relatively light-weight chopper/feeder unit mounted on a robot arm that places the output from the chopper/feeder unit a relatively short distance (e.g., only about a foot) from the preform screen for robotically directing the chopped fiberglass strands onto the preform screen.

In accordance with another aspect of the invention, one or more air amplifiers are mounted on the chopper/feeder unit to provide an air stream within the chopper/feeder box to carry the chopped fiberglass strands from the chopper/feeder box to the preform screen.

In accordance with another aspect of the invention, the air amplifiers generate enough velocity and volume of air within the chopper/feeder box to carry the chopped fiberglass strands away from the chopper/feeder cutter without bunching and clogging.

In accordance with another aspect of the invention, the spacing between the inside of the chopper/feeder box and the cutter is controlled to generate adequate air velocity within the box without restricting air flow from the input side of the box to the discharge side.

In accordance with another aspect of the invention, a relatively small variable speed motor is used to drive the cutter.

In accordance with another aspect of the invention, a hydraulic motor is used to drive the cutter, controlled by a servo valve and electronic sensor on the chopper rolls integrated with a programmable logic control unit (PLC) for controlling the cutter speed and thus the output of chopped fiberglass strands for controlling the distribution of the chopped fiberglass strands where desired on the preform screen.

These and other aspects, objects, advantages and features of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 5 is a further enlarged perspective side elevation view of the chopper/feeder unit with portions of one side broken away to show the interior of the unit; and FIG. 6 is a schematic diagram of a controller circuit for controlling the cutter speed of the chopper/feeder unit in relation to the rate of movement of the robot arm on which the chopper/feeder unit is mounted.

DETAILED DESCRIPTION OF THE PREFERRED EMBODIMENT

Figure 1:
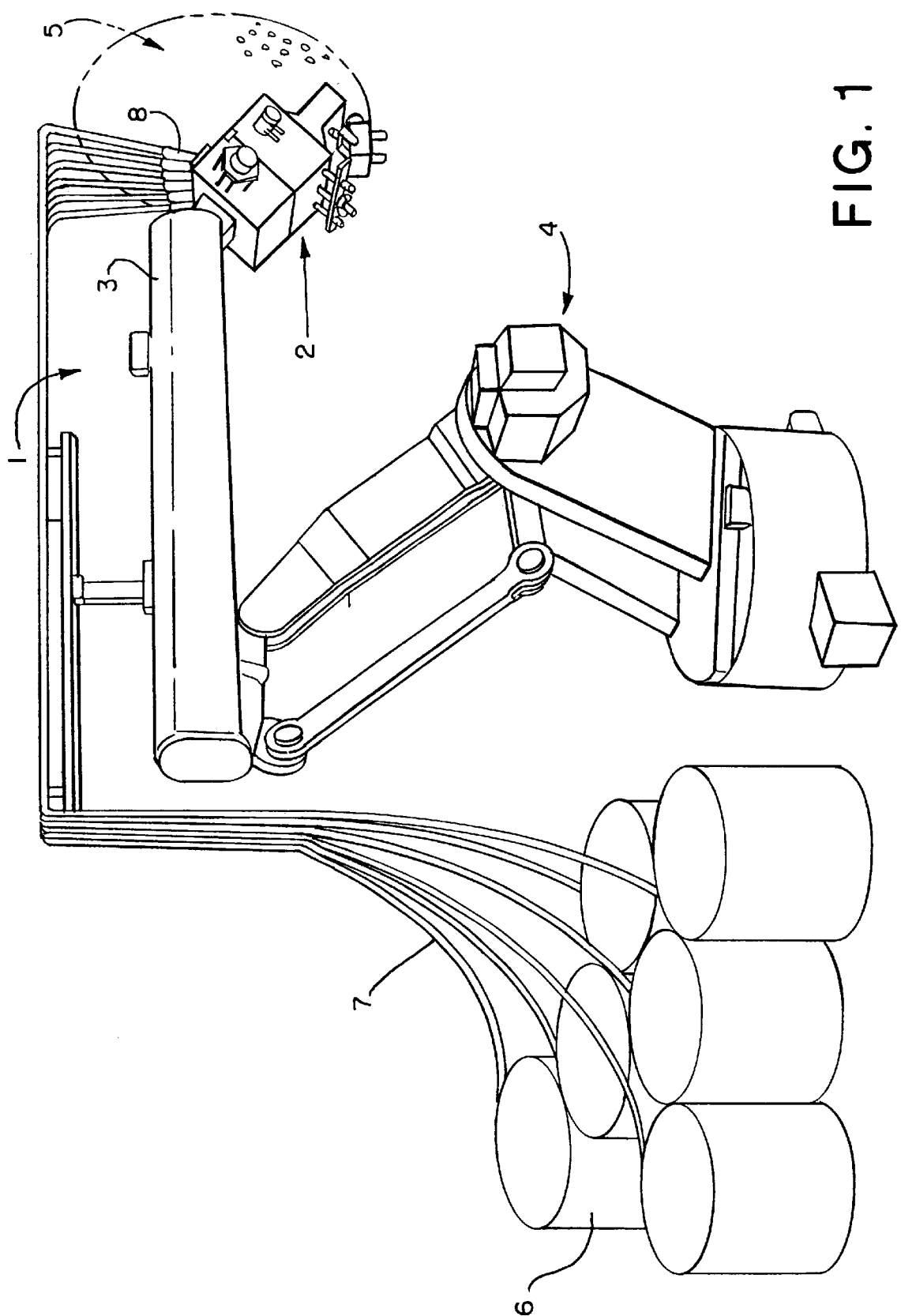
FIG. 1 is a schematic perspective view of a preferred form of fiberglass chopper/feeder delivery system in accordance with this invention.
Figure 2:
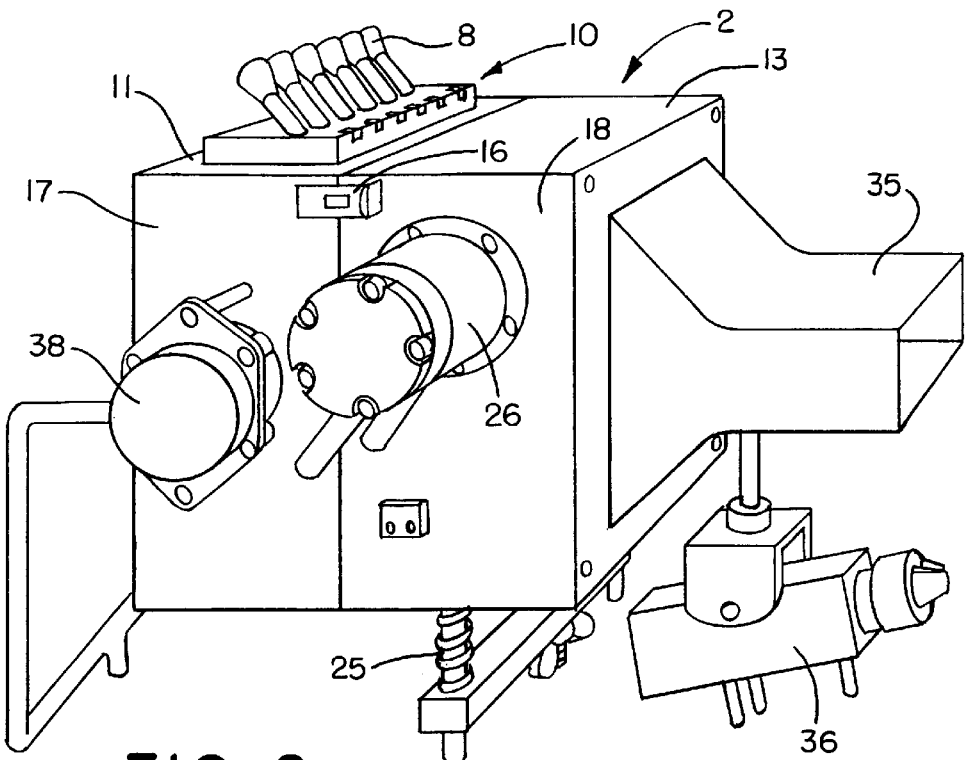
FIG. 2 is an enlarged perspective side elevation view of the chopper/feeder unit portion of the system of FIG. 1.
Figure 3:
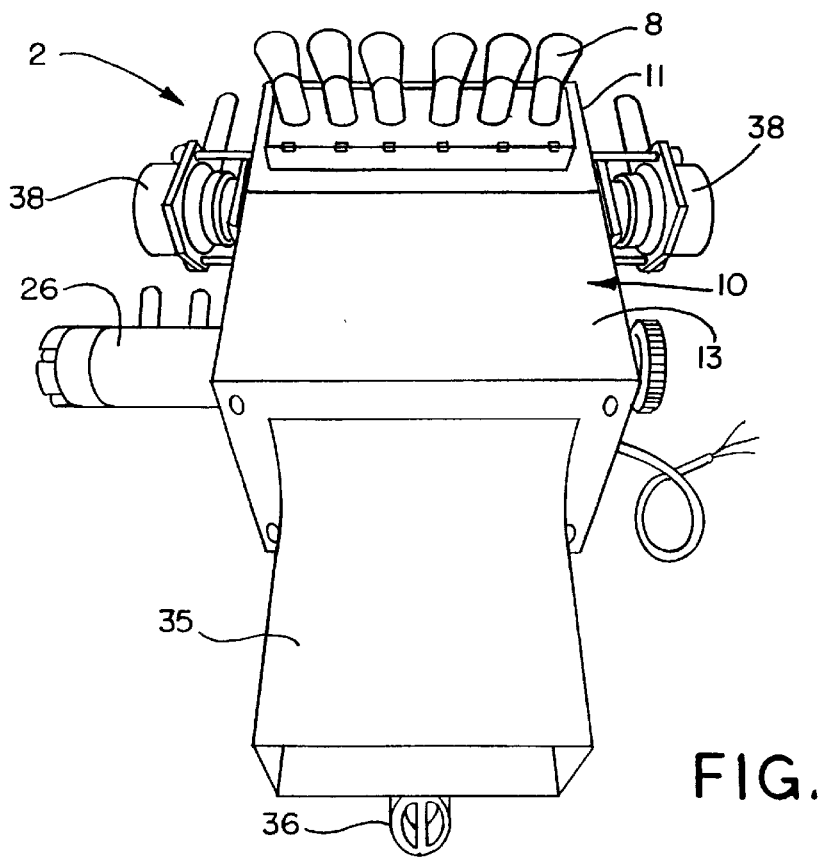
FIG. 3 is a perspective top plan view of the chopper/feeder unit of FIG. 2.

Referring now in detail to the drawings, and initially to FIG. 1, there is shown a preferred form of fiberglass chopper/feeder delivery system 1 in accordance with this invention including a relatively compact, lightweight fiberglass chopper/feeder unit 2 directly attached to the outer end of an articulating arm 3 of a robot 4 in order to place the output from the chopper/feeder unit a short distance (e.g., approximately a foot) from a preform screen 5 for robotically directing the discharge of chopped fiberglass strands from the chopper/feeder unit onto the preform screen where desired with very little loss as described hereafter. The robot 4 may be of conventional type suitable for the intended purpose. A series of balls 6 of continuous strands 7 of fiberglass, called fiberglass roving, are fed into the chopper/feeder unit 2 through a plurality of fiberglass roving feed tubes 8, six of which are shown for purposes of illustration.

Such a fiberglass chopper/feeder delivery system 1 may for example have four different work stations, one where one or more robots 4 are used to fill the screen 5 depending on the size of the screen, another where the binder of the preform is cured, another where the preform is removed from the screen, and another which may either be an idler station or another station where the binder of the preform is cured.

FIGS. 2 through 5 show the chopper/feeder unit 2 in greater detail. Such unit includes a box-like structure 10 comprised of two housing parts, a rear housing 11 (the back 1 2 of which is firmly bolted or otherwise secured to the outer end of the robot arm 3) and a front housing 13 which may be hingedly connected together along their bottom edges 14, 1 5 and releasably latched together by latches 16 mounted on the sides 17, 18 for easy service. Alternatively, the two housing parts 11, 13 may simply be latched together to permit the entire front housing part 13 to be removed as a unit from the rear housing part 11 for service and/or replacement as desired.

Figure 4:
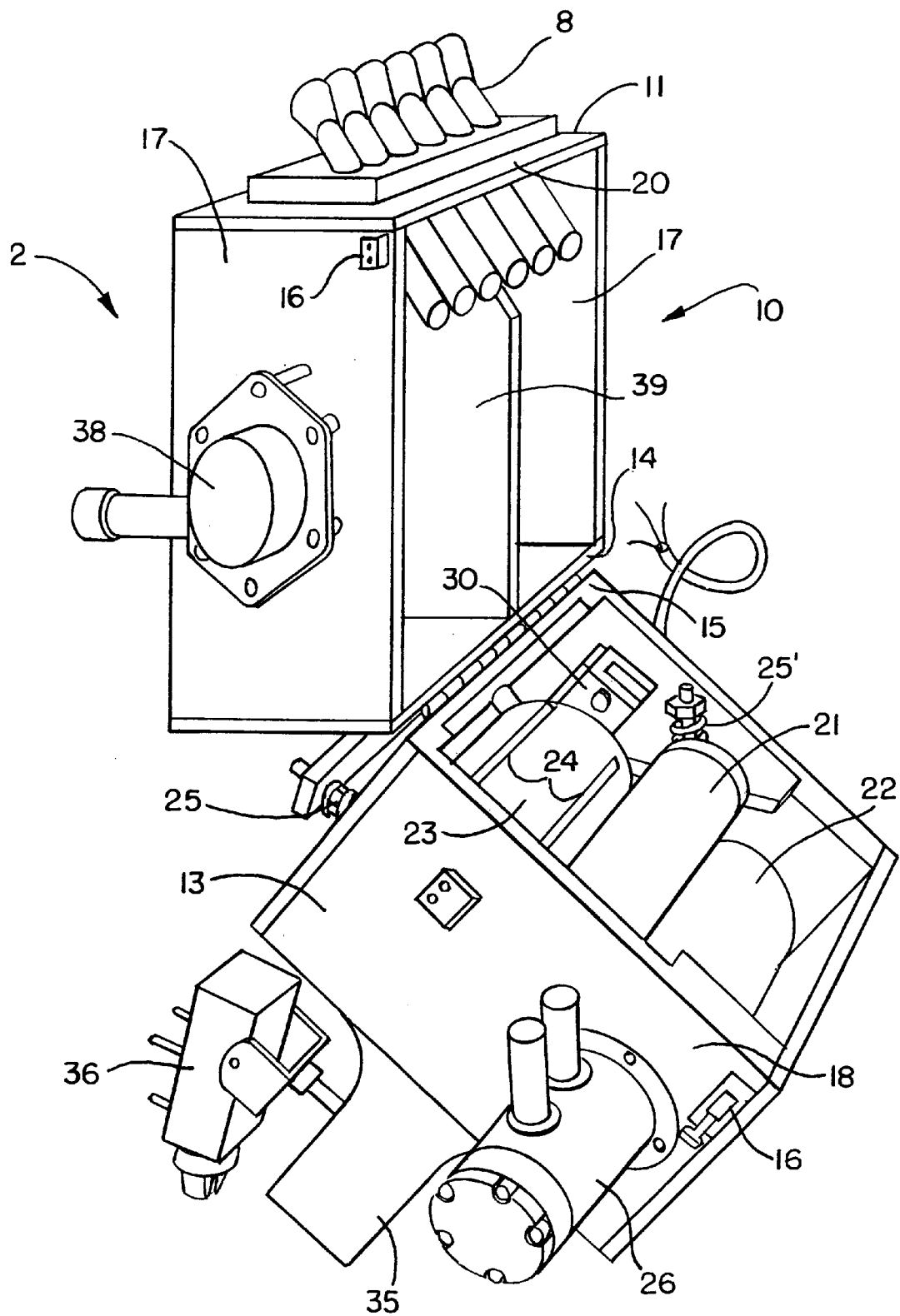
FIG. 4 is a further enlarged perspective side elevation view of the chopper/feeder unit of FIG. 2 but showing its two housing parts swung open for easy service.

FIGS. 4 and 5 show the interior of the chopper/feed box 10, with the fiberglass roving feed tubes 8 extending through the top 20 of the rear housing 11 at an angle for feeding the strands 7 of continuous fiberglass roving through the feed tubes and between an idler roll 21 and a rubber cot roll 22 as well as between the rubber cot roll and a metal cutter roll 23 rotatably mounted within the front housing 13. Mounted on the cutter roll 23 are a plurality of longitudinally extending, circumferentially spaced knife blades 24 that are held tight against the rubber cot roll 22 by springs 25, as is the idler roll 21 by springs 25'. The rubber cot roll 22 is driven by a relatively small but powerful variable speed motor 26 mounted on one side 18 of the front housing 13 and rotatably coupled to the rubber cot roll drive shaft 27. As the rubber cot roll 22 is rotated by the motor 26, the rubber cot roll drives the idler roll 21 and cutter roll 23, pulling the fiberglass roving 7 between the rolls and cutting it to the desired length. Alternatively, the motor 26 may be used to drive the cutter roll 23, which in turn drives the rubber cot roll 22 and idler roll 21.

Preferably the motor 26 is a hydraulic motor. An advantage in using a hydraulic motor 26 over an electric motor to drive the rubber cot roll 22 (or cutter roll 23) is that a hydraulic motor is much smaller and lighter for a given horsepower output. However, the motor 26 could be a variable speed electric motor with suitable feedback for controlling cutter speed if desired.

Controlled throughput of the chopper/feeder unit 2 of the present invention may be accomplished by providing an encoder pick-up 30 within the chopper/feeder box 10 that measures the number of revolutions of the metal cutter roll 23, which is a constant diameter as opposed to the driven rubber cot roll 22 which will vary in diameter due to wear, manufacturing variations and cutter pressure.

Where the variable speed motor 26 is a hydraulic motor, a servo valve 31, schematically shown in FIG. 6, is used to control the flow of hydraulic fluid to the motor. Whether the motor is a variable speed hydraulic or electric motor, a feed-back from the encoder pick-up 30 and a programmable logic control unit (PLC) 32, also schematically shown in FIG. 6, may be used to control the cutter speed to obtain a uniform distribution of chopped glass fibers in the preform as required to achieve uniform properties in the finished part. This is particularly important where the preform screen 5 has detailed areas and corners where the speed of movement of the robot 4 has to be slowed down to ensure proper placement of the chopped glass fibers without feeding too much chopped glass fibers onto the screen. To that end, the PLC 32 may be programmed so that as the rate of movement of the robot arm 3 slows down, the rate of throughput of the chopped glass fibers is proportionally reduced (i.e., the throughput of the chopper/feeder unit 2 is proportional to the rate of movement of the robot arm 3).

Mounted on the outer end of the front housing 13 is a funnelshaped discharge chute 35 which also provides a mount for a binder spray gun 36 used to spray a binder emulsion onto the chopped fiberglass strands deposited onto the preform screen 5. To pressurize the interior of the chopper/feeder box 10 and also provide adequate air velocity and volume to carry the chopped fiberglass strands 37 (see FIG. 5) out through the discharge chute 35 at the proper velocity and onto the preform screen 5, a pair of air amplifiers 38 are mounted on opposite sides of the rear housing 11. The air amplifiers convert small volumes of compressed air to a low pressure high volume air stream. Preferably the amplified ratio of the air amplifiers is between 15 and 17:1, which means that for each cubic foot per minute (CFM) of compressed air supplied to the air amplifiers, between 15 and 17 CFM of output air is generated. The air flow from the air amplifiers 38 is deflected toward the discharge chute 35 by a curved air deflector wall or saddle 39 in the back housing 11 intermediate the side walls 17 as schematically shown in FIG. 5.

The clearance space 40 between the rolls 22 and 23 and adjacent walls of the front housing 13 is such that the air flow generated by the air amplifiers 38 will produce enough velocity and volume of air within the chopped feed box 10 to carry the cut fiberglass strands 37 away from the cutter and out through the discharge chute 35 onto the preform screen 5. The velocity and volume of air generated by the air amplifiers 38 must not be so high that it will disturb the cut fiberglass strands deposited on the screen, but must not be so low that it will not carry the chopped fiberglass strands 37 away from the cutting blades 24 and rubber cot roll 22 as fast as they are generated or otherwise bunching and clogging may result.

If desired, a single air amplifier may be used to provide the desired volume and velocity of air flow through the chopper/feeder box 10 instead of two air amplifiers. However, a single larger air amplifier would protrude a substantially greater distance beyond one side of the box than two smaller air amplifiers. For example, a larger air amplifier would protrude approximately six inches from one side of the box 10, whereas two smaller air amplifiers 38 each only protrude approximately three inches from each side. This gives about 15% more rotation of the robot arm 3 in either direction.

The fiberglass chopper/feeder delivery system 1 of the present invention has the same output as previous chopper/feeder delivery systems. However, a big advantage of the present system is that placing the chopper/feeder unit 2 on the outer end of the robot arm 3 greatly reduces the distance that the chopped glass fibers 37 have to be carried by the air flow to the preform screen 5. The shorter the distance the chopped glass fibers have to travel, the less chance there is of the glass fibers falling out of the air stream, which results in a substantial savings of glass fibers. Also, by integrating an electronic sensor to count the cutter roll RPMs with a PLC to electronically control cutter speed and thus control fiberglass output during the cycle ensures a uniform distribution of glass fibers in the preform to achieve uniform properties in the finished part.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A system for delivering chopped fiberglass strands to a preform screen comprising a robot having an articulating arm, and a chopper/feeder unit mounted on an outer end of said arm for movement therewith, said chopper/feeder unit comprising a housing containing a cutter for chopping fiberglass strands fed into said housing into desired lengths, a variable speed motor mounted on said housing for driving said cutter, a discharge chute at an outer end of said housing, and two air amplifiers attached to opposite sides of said housing upstream of said cutter for generating an air stream within said housing to carry the chopped fiberglass strands out through said discharge chute.

2. The system of claim 1 wherein said cutter comprises a rubber cot roll, and a cutter roll pressed tight against said rubber cot roll for chopping the fiberglass strands passing between said rolls, said motor being drivingly connected to one of said rolls.

3. The system of claim 2 further comprising an idler roll pressed tight against said rubber cot roll for pulling the fiberglass strands between said rolls.

4. The system of claim 2 wherein a clearance space between said housing and said rolls produces enough velocity and volume of the air stream generated within said housing by said air amplifiers to carry the chopped fiberglass strands away from said rolls and out through said discharge chute.

5. The system of claim 2 wherein said motor is a hydraulic motor, further comprising an encoder pick-up for measuring the number of revolutions of said cutter roll, a servo valve for controlling hydraulic fluid flow to said hydraulic motor, and a controller for controlling the speed of said cutter roll in proportion to the rate of movement of said robot arm to obtain a controlled distribution of chopped fiberglass strands to a preform screen.

6. The system of claim 2 wherein said motor is a variable speed electric motor, further comprising an encoder pick-up for measuring the number of revolutions of said cutter roll, and a controller for controlling the speed of said cutter roll in proportion to the rate of movement of said robot arm to obtain a controlled distribution of chopped fiberglass strands to a preform screen.

7. The system of claim 1 further comprising a curved air deflector in said housing for deflecting the air stream from said air amplifiers toward and around said cutter.

8. The system of claim 1 further comprising a spray gun mounted on said discharge chute for spraying a binder emulsion onto the chopped fiberglass strands deposited on a preform screen.

9. A system for delivering chopped fiberglass strands to a preform screen comprising a robot having an articulating arm, and a chopper/feeder unit mounted on an outer end of said arm for movement therewith, said chopper/feeder unit comprising a housing containing a cutter for chopping fiberglass strands fed into said housing into desired lengths, a variable speed motor mounted on said housing for driving said cutter, a discharge chute at an outer end of said housing, and an air amplifier attached to said housing for generating an air stream within said housing to carry the chopped fiberglass strands out through said discharge chute, said housing comprising a back housing part attached to said robot arm, a front housing part connected to said back housing part, and a latch mechanism for releasably latching said housing parts together for easy access to said housing parts, said air amplifier being attached to a side of said back housing part upstream of said front housing part, and said motor being attached to a side of said front housing part, said front housing part containing said cutter, and said discharge chute extending forwardly from said front housing part downstream of said cutter.

10. The system of claim 9 further comprising fiberglass roving tubes extending through a top wall of said back housing part for feeding the fiberglass strands through said back housing part to said cutter in said front housing part.

11. A system for delivering chopped fiberglass strands to a preform screen comprising a robot having an articulating arm, a housing attached to an outer end of said arm, a cutter within said housing for chopping fiberglass strands fed into said housing to a desired length, a discharge chute extending from said housing downstream of said cutter, and an air amplifier connected to said housing upstream of said cutter for introducing an air stream into said housing to carry the chopped fiberglass strands away from said cutter and out through said discharge chute onto a preform screen in close proximity to said discharge chute, said housing comprising a first housing part attached to said robot arm and a second housing part connected to said first housing part and releasably latched to said first housing part for gaining easy access to the interior of said housing.

12. The system of claim 11 wherein said second housing part contains said cutter, a variable speed motor is mounted on one side of said second housing part for driving said cutter, and said air amplifier is mounted to said first housing part.

13. The system of claim 12 wherein two air amplifiers are attached to opposite sides of said first housing part, and a curved air deflector is mounted within said first housing part in line with said air amplifiers for deflecting the air stream from said air amplifiers toward and around said cutter within said second housing part.

14. The system of claim 13 further comprising a spray gun attached to said discharge chute for spraying a binder onto the chopped fiberglass strands deposited onto the preform screen.

15. The system of claim 11 wherein said cutter comprises a rubber cot roll, a cutter roll pressed tight against said rubber cot roll, a variable speed motor drivingly connected to one of said rolls, and an idler roll pressed tight against said rubber cot roll for pulling the fiberglass strands entering said housing between said rolls.

16. The system of claim 15 wherein a clearance space is provided between said housing and said rolls to produce enough velocity and volume of the air stream introduced into said housing by said air amplifier to carry the chopped fiberglass strands away from said rolls and out through said discharge chute.

17. The system of claim 15 wherein an air amplifier is attached to each side of said housing upstream of said cutter, and a curved air deflector is mounted within said housing in line with said air amplifiers for deflecting the air stream from said air amplifiers toward and around said cutter.

18. The system of claim 15 further comprising an encoder within said housing for measuring the number of revolutions of said cutter roll, and a programmable logic control unit for controlling the speed of said cutter roll in relation to the rate of movement of said robot arm to obtain a controlled output distribution of chopped fiberglass strands from said system in relation to the speed of movement of said robot arm.

* * * * *